(12) United States Patent
Vath et al.

(10) Patent No.: US 9,188,196 B2
(45) Date of Patent: Nov. 17, 2015

(54) DRIVE TRAIN OF A FLUID FLOW POWER PLANT

(75) Inventors: Andreas Vath, Leidersbach (DE); Raphael Stumpp, Ludwigsburg (DE); Isabella Stamm, Steinfeld (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 14/130,931

(22) PCT Filed: Jun. 18, 2012

(86) PCT No.: PCT/EP2012/002568
§ 371 (c)(1),
(2), (4) Date: Apr. 18, 2014

(87) PCT Pub. No.: WO2013/004345
PCT Pub. Date: Jan. 10, 2013

(65) Prior Publication Data
US 2014/0221144 A1 Aug. 7, 2014

(30) Foreign Application Priority Data
Jul. 5, 2011 (DE) .......................... 10 2011 106 535

(51) Int. Cl.
*F03D 11/02* (2006.01)
*F16H 1/22* (2006.01)
*F16H 37/08* (2006.01)
*F16H 1/46* (2006.01)
*F03D 11/00* (2006.01)
*F16H 1/28* (2006.01)

(52) U.S. Cl.
CPC ............... *F16H 1/46* (2013.01); *F03D 11/0066* (2013.01); *F03D 11/0075* (2013.01); *F03D 11/02* (2013.01); *F05B 2260/4023* (2013.01); *F05B 2260/40311* (2013.01); *F16H 2001/289* (2013.01); *Y02E 10/722* (2013.01)

(58) Field of Classification Search
CPC ........ F03D 11/02; F16H 1/22; F16H 37/0833
See application file for complete search history.

(56) References Cited

U.S. PATENT DOCUMENTS

| 2004/0237683 A1 | 12/2004 | Mikhail et al. | |
| 2012/0231923 A1 * | 9/2012 | Fox et al. | 475/337 |

FOREIGN PATENT DOCUMENTS

| DE | 4029722 A1 * | 3/1992 |
| DE | 10 2004 022 299 A1 | 12/2005 |

(Continued)

OTHER PUBLICATIONS

International Search Report corresponding to PCT Application No. PCT/EP2012/002568, mailed Oct. 17, 2012 (German and English language document) (7 pages).

*Primary Examiner* — Tisha Lewis
(74) *Attorney, Agent, or Firm* — Maginot, Moore & Beck LLP

(57) ABSTRACT

A drive train of a fluid flow power plant, in particular of a wind power plant or of a tidal power plant, includes a rotor hub that bears at least one rotor blade and a transmission that has a plurality of planetary stages. The transmission is configured to transmit a rotational movement of a rotor shaft connected to the rotor hub to a drive of a downstream generator in a stepped-up fashion. The rotor hub, the transmission, and the generator are arranged coaxially with respect to one another. The transmission is embodied as a power-split transmission with three planetary stages so as to form a suitable transmission ratio of a rotational movement of the rotor shaft on the drive of the generator in a compact fashion.

19 Claims, 3 Drawing Sheets

(56) References Cited

FOREIGN PATENT DOCUMENTS

| | | |
|---|---|---|
| DE | 10 2009 052 240 A1 | 5/2011 |
| EP | 1 243 791 A2 | 9/2002 |
| EP | 1 283 359 A1 | 2/2003 |
| EP | 2 031 273 A2 | 3/2009 |
| WO | 01/50038 A1 | 7/2001 |
| WO | 2008/068260 A2 | 6/2008 |
| WO | 2008/104257 A1 | 9/2008 |
| WO | WO 2011056344 A1 * | 5/2011 |

* cited by examiner

DRIVE TRAIN OF A FLUID FLOW POWER PLANT

This application is a 35 U.S.C. §371 National Stage Application of PCT/EP2012/002568, filed on Jun. 18, 2012, which claims the benefit of priority to Serial No. DE 10 2011 106 535.4, filed on Jul. 5, 2011 in Germany, the disclosures of which are incorporated herein by reference in their entirety.

BACKGROUND

The disclosure relates to a drive train of a continuous-flow power plant, in particular a wind power plant or a tidal power plant, comprising a rotor hub which carries at least one rotor blade, and a gear mechanism which has a plurality of planetary stages and effects stepped-up transmission of a rotary movement of a rotor shaft connected to the rotor hub to a drive of a downstream generator, wherein the rotor hub, the gear mechanism and the generator are disposed coaxially with respect to one another.

EP 20 31 273 A1 has disclosed such a drive train of a wind power plant, in which a rotary motion of a rotor hub can be introduced into a gear mechanism by means of a rotor shaft connected to the rotor hub. Then, a rotary motion of the rotor shaft is stepped-up via the gear mechanism and transmitted to a generator shaft of a downstream generator, the gear mechanism for this purpose being composed of two successive planetary stages. In this case, a sun wheel of the first planetary stage is configured integrally with the rotor shaft, while a ring gear of the first planetary stage is fixed to a surrounding casing, so that a rotary motion of the sun wheel of the first planetary stage is stepped up and converted into a rotary motion of a planet carrier of the first stage, which at an axial extension simultaneously also forms a planet carrier of the second planetary stage. At the second planetary stage, the planet gears then mesh with a likewise stationary ring gear and a sun wheel coupled to the generator shaft. In this way, the overall effect is that the slow rotary motion of the rotor shaft can be converted into a rotary motion which is therefore suitable for operating the generator. The rotor hub, the gear mechanism and the generator are positioned coaxially to one another.

Starting from the prior art described above, the object of the present disclosure is that of providing a drive train of a continuous-flow power plant in which a suitable transmission of a rotary motion of a rotor shaft, via a gear mechanism, to a drive of a downstream generator can be provided in a compact way.

SUMMARY

This object is achieved by a drive train of a continuous-flow power plant having the features of the disclosure. The subsequent dependent claims each provide advantageous developments of the disclosure.

According to the disclosure, a drive train of a continuous-flow power plant comprises a rotor hub, which carries at least one rotor blade, and a gear mechanism having a plurality of planetary stages. The gear mechanism effects stepped-up transmission of a rotary motion of a rotor shaft connected to the rotor hub to a drive of a generator connected downstream of the gear mechanism, wherein the rotor hub, the gear mechanism and the generator are disposed coaxially with respect to one another. In the context of the disclosure, the generator may be an axial-flow machine, an externally excited synchronous generator, an externally excited synchronous generator with an exciter machine co-rotating on a shaft, a synchronous generator with permanent magnets or magnetic excitation or a synchronous generator with super conductors. Furthermore, the generator may be configured as a synchronous generator and as a transverse-flow machine. Furthermore, it is conceivable for the synchronous generator to be configured as an external rotor or as an internal rotor. With regard to the gear mechanism, a generator configured as a synchronous generator may completely or partially surround the gear mechanism or may also be completely or partially integrated in the gear mechanism. Furthermore, within the scope of the disclosure it is also possible for a brake system to be provided on a shaft of the generator. This brake system may either be seated on a generator input shaft or, in the case of a generator attached directly to the gear mechanism, may be provided in the rear region of the generator.

The disclosure encompasses the technical teaching that the gear mechanism is configured as a power-split gear mechanism having three planetary stages. Such a configuration of a gear mechanism, and its positioning in the drive train of a continuous-flow power plant, has the advantage that a very compact gear mechanism can be realized in this way, by means of which, on account of the power splitting, a suitable accelerated transmission of a rotary motion of the rotor hub for the drive of the generator can be produced with very small dimensions in the axial direction. In combination with the coaxial arrangement of rotor hub, gear mechanism and generator, it is as a result possible to realize a drive train which is of compact configuration in the radial and axial directions. Within the context of the disclosure, the power-split gear mechanism can be used in particular to achieve a step-up ratio in the range of i=20-50.

According to the disclosure, the power-split gear mechanism having three planetary stages is configured in such a manner that a drive, coupled to the rotor shaft, of the gear mechanism is connected to a planet carrier of a first planetary stage and a ring gear of a second planetary stage. Furthermore, a ring gear of the first planetary stage is fixed and a sun wheel of the first planetary stage is coupled to a first shaft, which as it continues is connected to a planet carrier of a third planetary stage. Moreover, a planet carrier of the second planetary stage is fixed and a sun wheel of the second planetary stage is connected via a second shaft to a ring gear of the third planetary stage. Finally, a sun wheel of the third planetary stage is also connected to an output of the gear mechanism. Such a configuration of a power-split gear mechanism has the advantage that a suitable step-up ratio can be achieved with a particularly compact overall form of the gear mechanism.

According to an advantageous embodiment of the disclosure, the rotor shaft is mounted, via a main bearing, in a surrounding support structure, to which a gear mechanism casing which holds the gear mechanism is connected on both sides via torque brackets. Supporting the drive train at three points in this way has the advantage that therefore only one bearing point has to be provided in the region of the rotor shaft, which correspondingly reduces the manufacturing outlay involved in producing the drive train according to the disclosure.

As an alternative to this possible configuration, the rotor shaft is mounted in a surrounding support structure via two main bearings located one behind the other in the axial direction, in which case a gear mechanism casing which holds the gear mechanism is connected to this support structure on both sides via torque brackets. In this case, therefore, the drive train is supported at four points, so that transverse forces and bending moments caused via the rotor shaft can be absorbed and introduced into the support structure by the two main bearings of the rotor shaft and via the torque brackets on both sides of the gear mechanism. As a result, therefore, the gear mechanism is subjected only to torsional moments. By providing two main bearings, it is possible for these main bearings to be of correspondingly small design.

In both the abovementioned variants, the main bearings may be configured as ball, cylinder or tapered roller bearings, and also as sliding bearings. Each of the main bearings is attached to the support structure in particular via a casing with the highest possible area moment of inertia, in order to achieve the highest possible strength combined with little use of material. The torque brackets on both sides of the gear mechanism may preferably be hydraulic torque brackets.

According to a further alternative configuration of the disclosure, the rotor shaft, in the region of the rotor hub, is mounted on a shaft section via a large bearing. This has the advantage that in this way the drive train is mounted centrally and by means of just one bearing, which in particular correspondingly reduces the space requirement in the region of the gear mechanism and the generator. Moreover, it is in this way possible to dispense with the torque brackets in the region of the gear mechanism. The large bearing is preferably configured as a double-row tapered roller bearing, so that transverse forces and bending moments are absorbed and only torsional moments are introduced into the downstream gear mechanism. In this case too, the large bearing can be attached to the support structure in particular via a casing having the highest possible area moment of inertia, so that the maximum possible strength can be achieved with little use of material.

In a refinement of the disclosure, the generator is placed in a gear mechanism casing which holds the gear mechanism. Such a configuration has the advantage that in this way the gear mechanism and generator can be arranged very close together, so that the overall size of the drive train is very short in the axial direction. Moreover, it is in this way possible to eliminate a generator casing which must otherwise be provided, so as to correspondingly reduce the manufacturing outlay and the overall weight of the drive train.

According to an alternative embodiment of the disclosure, the generator is held in a generator casing provided separately from a gear mechanism casing, with the gear mechanism casing once again encapsulating the gear mechanism. If the two casings are formed separately, it is accordingly possible for the individual components to be easily replaced in the event of damage, without first of all having to remove the entire drive train from the support structure. Furthermore, the individual component is as a result readily accessible from the outside for maintenance purposes. Finally, a separate design of gear mechanism casing and generator casing prevents bending moments from being transmitted from the gear mechanism to the generator.

In a refinement of the abovementioned configuration, however, the separately configured generator casing is flanged to the gear mechanism casing. As a result, there is no need for the generator to be separately attached to the support structure, and moreover a common oil supply can be provided for the gear mechanism and the generator.

In the abovementioned variants, it is within the scope of the disclosure for the gear mechanism casing and/or the generator casing to be provided on a respective underside with a corresponding reinforcement, which in this case is formed for example by ribs, feet or a corresponding support.

Moreover, according to the disclosure, the rotor shaft and a drive of the gear mechanism are connected to one another via a clutch. This clutch is preferably in the form of meshed toothing, so as to achieve an easily fitted connection between the rotor shaft and the drive of the gear mechanism, which, moreover, can also easily be detached again, for example for maintenance purposes. Moreover, meshed toothing can be used to compensate for any possible axial offset between the rotor shaft and the drive of the gear mechanism and to prevent the introduction of bending moments. However, another way of coupling the drive of the gear mechanism to the rotor shaft via rigid or elastic clutches is also conceivable within the context of the disclosure.

According to a further configuration of the disclosure, a shaft, which connects an output of the gear mechanism and the drive of the generator, is universal jointed both on the side of the gear mechanism and on the side of the generator. It is in this way advantageously possible to compensate for an axial offset between gear mechanism and generator, which may occur for example as a result of tilting and shifting caused by rotor-side gear mechanism loading.

In a refinement of the disclosure, a shaft, which connects an output of the gear mechanism and a rotor of the generator, is supported via the rotor, with the rotor being bearing-mounted on both sides. It is in this way advantageously possible to dispense with mounting the shaft on the sides of the gear mechanism as a result of the generator undertaking mounting of the output shaft.

Furthermore, according to the disclosure, starting from a side of the generator which is remote from the gear mechanism, a tube runs coaxially through generator and gear mechanism to the rotor hub. Such a configuration has the advantage that in this way electrical and/or hydraulic lines to the rotor hub can be passed via this tube through generator and gear mechanism, in order to enable actuating mechanisms for adjusting the rotor blades or else a sensor means to be supplied with power or pressurized fluid in the region of the rotor hub. This tube may be provided in a stationary configuration or in a rotating configuration, in particular rotating together with the rotor shaft.

According to a further embodiment of the disclosure, an output of the gear mechanism is electrically insulated from the drive of the generator. It is in this way possible to reliably prevent the undesirable introduction of electric power into the gear mechanism via the generator. As an alternative or in addition thereto, a gear mechanism casing which holds the gear mechanism is insulated from a generator casing which carries the generator.

The disclosure is not restricted to the specified features of the main claim or of the dependent claims. It is also possible for individual features, to the extent that they can be determined from the claims, the following description of embodiments or directly from the drawings, to be combined with one another. The referencing of the claims to the figures through the use of reference symbols is not intended to restrict the scope of protection of the claims.

BRIEF DESCRIPTION OF THE DRAWINGS

Further advantageous configurations of the disclosure will emerge from the following description of preferred embodiments of the disclosure, which refers to the figures illustrated in the drawings, in which.

DETAILED DESCRIPTION

Figure 1:
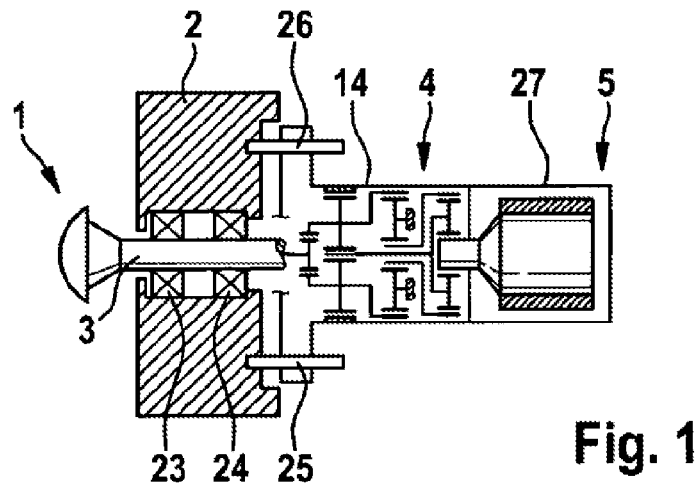
FIG. 1 shows a schematic view of a drive train according to the disclosure in a wind power plant according to a first preferred embodiment of the disclosure.

FIG. 1 shows a schematic illustration of a drive train according to the disclosure corresponding to a first preferred configuration of the disclosure, which in this case is a drive train of a continuous-flow power plant, in particular a wind power plant. As can be seen, this drive train comprises a rotor hub 1, which serves to hold rotor blades—not illustrated further—and by way of which the drive train is led out of a support structure 2 (only partially indicated) of the wind power plant. The rotor blades (not shown) can be used to induce a rotary motion of the rotor hub 1 as a result of the flow of wind. Starting from the rotor hub 1, a rotor shaft 3, which is connected by meshing toothing to a downstream gear mechanism 4, extends in the direction of the support structure 2. This gear mechanism is arranged coaxially to the rotor hub 1 and is responsible for step-up transmission of a rotary motion of the rotor hub 1, introduced via the rotor shaft 3, to a drive of a likewise coaxially arranged, downstream generator 5.

Figure 2:
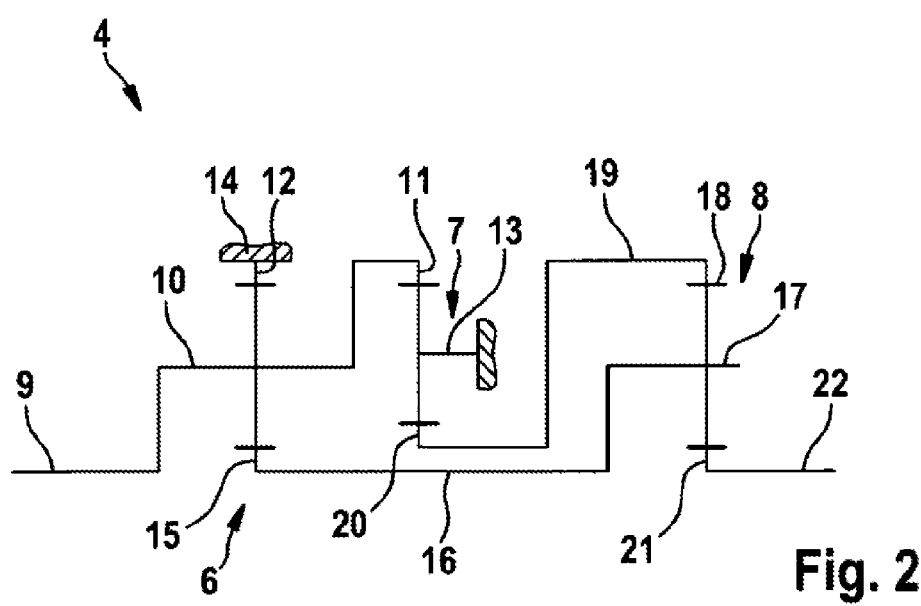
FIG. 2 shows a schematic of a power-split gear mechanism of the drive train shown in FIG. 1.

As can be seen here in combination with the schematic from FIG. 2, the gear mechanism 4 is configured as a power-split gear mechanism having three planetary stages 6, 7 and 8. A drive 9, which is coupled to the rotor shaft 3, is connected to a planet carrier 10 of the first planetary stage 6 and a ring gear 11 of the second planetary stage 7, whereas a ring gear 12 of the first planetary stage 6 and a planet carrier 13 of the second planetary stage 7 are fixed in terms of rotation to a gear mechanism casing 14. Furthermore, a sun wheel 15 of the first planetary stage 6 is coupled via a first shaft 16 to a planet carrier 17 of the third planetary stage 8, the ring gear 18 of which is connected by means of a second shaft 19 to a sun wheel of the second planetary stage 7. Finally, a sun wheel 21 is also coupled to an output 22 of the gear mechanism 4. Overall, in this way, the third planetary stage 8 is responsible for bringing together the forces flowing across the two preceding planetary stages 6 and 7.

As can also be seen from FIG. 1, the drive train according to the disclosure is mounted on the support structure 2 at a total of four points. This mounting is formed on the one hand by two main bearings 23 and 24 and on the other hand via two torque brackets 25 and 26, the latter producing a connection between the support structure 2 and the gear mechanism casing 14. The main bearings 23 and 24, which are arranged one behind the other in the axial direction, are in this case configured as roller bearings. Overall, the four-point mounting of the drive train causes transverse forces and bending moments coming from the rotor hub 1 to be introduced into the support structure 2 through two bearing points formed by the main bearings 23 and 24 and two torque brackets 25 and 26 provided on either side of the gear mechanism casing 14, so that only torsional moments are applied to the drive 9 of the gear mechanism 4.

Figure 3:
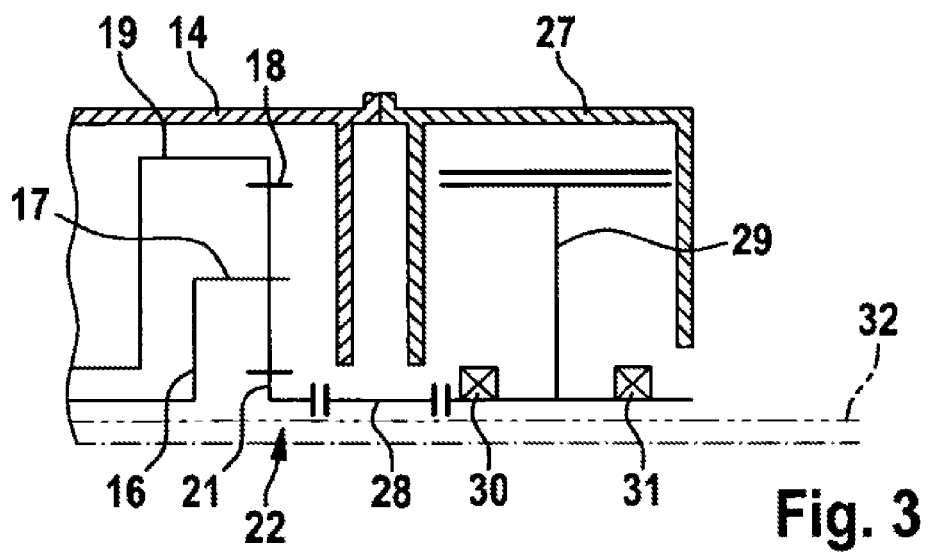
FIG. 3 shows a schematic view of a detail of the gear mechanism and a downstream generator of the drive train from FIG. 1.

As a further detail, the generator 5 is accommodated in a generator casing 27 formed separately from the gear mechanism casing 14, this generator casing 27 being flanged to the gear mechanism casing 14. Furthermore, as will be seen from the additional FIG. 3, the output 22 of the gear mechanism 4 is connected via an intermediate shaft 28 to a rotor 29 forming the drive of the generator 5, the rotor 29 being mounted in the generator casing 27 on both sides via bearings 30 and 31, so that the shaft 28 and also the sun wheel 21 are at least axially supported by the rotor 29. Furthermore, the shaft 28—in the present case illustrated as a clutch—is universal-jointed both on the side of the gear mechanism and on the side of the generator 5, so that it is possible to compensate for minor axial offset between the sun wheel 21 and the rotor 29 by means of the shaft 28. The shaft 28 can also form an insulation between generator 5 and gear mechanism 4, so that it is impossible for any leakage currents to be introduced into the gear mechanism 4 via the shaft 28. Finally, FIG. 3 also shows part of a—schematically indicated—tube 32, which runs from that side of the generator which is remote from the gear mechanism 4 coaxially through generator 5 and gear mechanism 4 to the rotor hub 1 and is not indicated further in the schematic illustration presented in FIG. 1. This tube 32 can be used to pass electrical or hydraulic supply lines from the rear region of the generator 5 to the rotor hub 1, via which lines actuating mechanisms in the region of the rotor hub 1 or else sensors are supplied, and heat can also be supplied.

Figure 4:
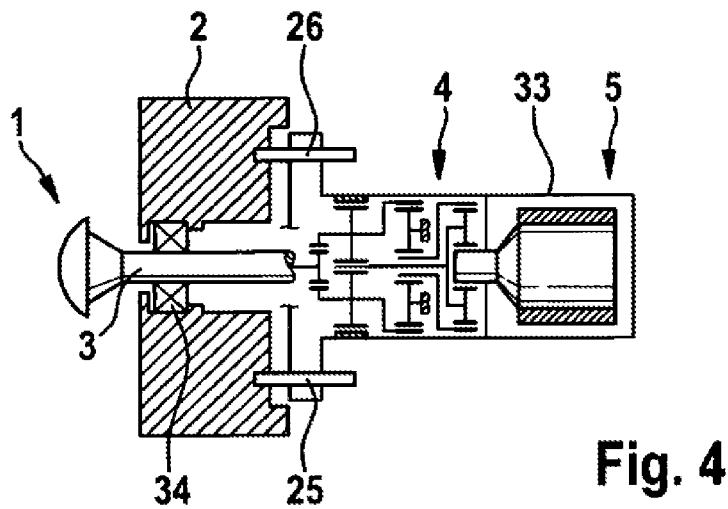
FIG. 4 shows a schematic illustration of a drive train according to the disclosure in a wind power plant according to a second preferred configuration of the disclosure.

FIG. 4 illustrates a schematic plan view of a drive train of a wind power plant according to a second preferred embodiment of the disclosure. Unlike in the variant described above, in this case the drive train is supported on the support structure at only three points. In addition to the torque brackets 25 and 26, which were already present in the previous variant and via which a gear mechanism casing 33 is connected on both sides to the support structure 2, in this case only a single main bearing 34 is provided in the region of the rotor shaft 3, said main bearing 34 in this case being configured as a roller bearing. As a further difference, in addition to the gear mechanism 4 the gear mechanism casing 33 also holds the generator 5, so that overall a drive train of very compact construction can be realized.

Figure 5:
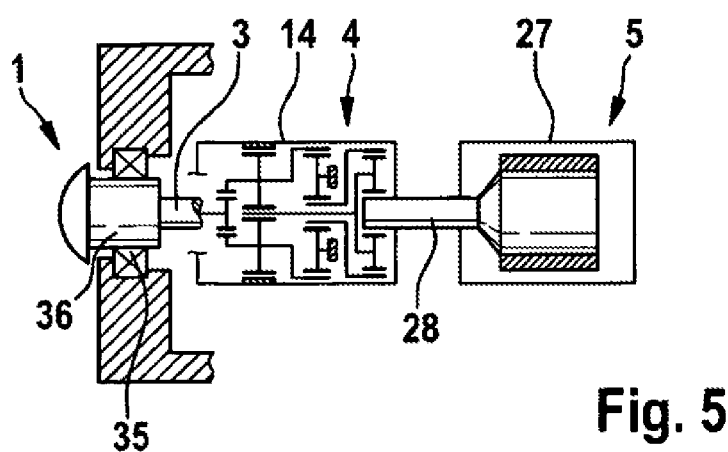
FIG. 5 shows a schematic view of a drive train according to the disclosure in a wind power plant according to a further, third preferred configuration of the disclosure.

Finally, FIG. 5 also shows a third preferred embodiment of a drive train according to the disclosure. Unlike the variants described above, this drive train is mounted on a shaft section 36 of the rotor shaft 3 and in the region of the rotor hub 1 purely by means of one large bearing 35. In this case, the transverse forces and bending moments introduced through the rotor hub 1 are absorbed by the large bearing 35 and introduced into the support structure 2, so that the downstream gear mechanism 4 is subjected only to torsional moments. The large bearing 35 is configured as a double-row tapered roller bearing which is able to absorb axial and radial forces. As a further difference, in this case the generator casing 27 is arranged at a distance from the gear mechanism casing 14 of the gear mechanism 4, with a connection between generator 5 and gear mechanism 4 being produced only by way of the intermediate shaft 28. Accordingly, the two components gear mechanism 4 and generator 5 are easily accessible individually and can also be replaced individually in the event of damage. Furthermore, there are no bending moments introduced from the gear mechanism 4 into the generator 5.

The exemplary embodiments described above can also be combined with one another in any desired way in terms of the bearing arrangement for the drive train and the way in which the gear mechanism 4 and the generator 5 are held in one or more casings. For example, in the case of the four-point bearing arrangement of the first exemplary embodiment, it is also possible for the generator 5 to be arranged in a gear mechanism casing 33 or for the generator casing 27 to be arranged separately. In the case of the second embodiment of the disclosure, i.e. the three-point bearing arrangement of the drive train, it is also possible for the generator 5 to be arranged in a separate generator casing 27, in which case said casing can then either be flanged to the gear mechanism casing 14 or provided separately therefrom. Finally, in the case of the last possible embodiment of the disclosure, namely with the bearing provided by way of a large bearing 35, it is also possible for the generator casing 27 to be flanged to the gear mechanism casing 14 or even for the generator 5 to be integrated into a gear mechanism casing 33.

The configuration options according to the disclosure therefore make it possible to design a compact drive train of a continuous-flow power plant, in which a rotary motion of a rotor hub 1 can be suitably stepped-up and transmitted to the drive of a generator 5.

LIST OF REFERENCE SYMBOLS

1 Rotor hub
2 Support structure
3 Rotor shaft
4 Gear mechanism
5 Generator
6 First planetary stage
7 Second planetary stage
8 Third planetary stage
9 Drive
10 Planet carrier
11 Ring gear
12 Ring gear
13 Planet carrier
14 Gear mechanism casing
15 Sun wheel
16 First shaft
17 Planet carrier
18 Ring gear
19 Second shaft
20 Sun wheel
21 Sun wheel
22 Output
23 Main bearing
24 Main bearing
25 Torque bracket
26 Torque bracket
27 Generator casing
28 Shaft
29 Rotor
30 Bearing
31 Bearing
32 Tube
33 Gear mechanism casing
34 Main bearing
35 Large bearing
36 Shaft section

The invention claimed is:

1. A drive train of a continuous-flow power plant, comprising:
   a rotor hub carrying at least one rotor blade; and
   a gear mechanism having a plurality of planetary stages, the gear mechanism being configured to effect stepped-up transmission of a rotary movement of a rotor shaft connected to the rotor hub to a drive of a downstream generator,
   wherein the rotor hub, the gear mechanism, and the generator are disposed coaxially with respect to one another,
   wherein the gear mechanism is configured as a power-split gear mechanism having three planetary stages, and
   wherein the rotor shaft is mounted via a main bearing in a surrounding support structure to which a gear mechanism casing configured to hold the gear mechanism is connected on both sides via torque brackets.

2. The drive train as claimed in claim 1, wherein a shaft that connects an output of the gear mechanism and the drive of the generator is universal jointed both on the side of the gear mechanism and on the side of the generator.

3. A drive train of a continuous-flow power plant, comprising:
   a rotor hub carrying at least one rotor blade; and
   a gear mechanism having a plurality of planetary stages, the gear mechanism being configured to effect stepped-up transmission of a rotary movement of a rotor shaft connected to the rotor hub to a drive of a downstream generator,
   wherein the rotor hub, the gear mechanism, and the generator are disposed coaxially with respect to one another,
   wherein the gear mechanism is configured as a power-split gear mechanism having three planetary stages, and
   wherein the rotor shaft is mounted via two main bearings, lying one behind the other in the axial direction, in a surrounding support structure to which a gear mechanism casing configured to hold the gear mechanism is connected on both sides via torque brackets.

4. The drive train as claimed in claim 3, wherein a shaft that connects an output of the gear mechanism and the drive of the generator is universal jointed both on the side of the gear mechanism and on the side of the generator.

5. A drive train of a continuous-flow power plant, comprising:
   a rotor hub carrying at least one rotor blade; and
   a gear mechanism having a plurality of planetary stages, the gear mechanism being configured to effect stepped-up transmission of a rotary movement of a rotor shaft connected to the rotor hub to a drive of a downstream generator,
   wherein the rotor hub, the gear mechanism, and the generator are disposed coaxially with respect to one another,
   wherein the gear mechanism is configured as a power-split gear mechanism having three planetary stages, and
   wherein, starting from a side of the generator that is remote from the gear mechanism, a tube runs coaxially through the generator and the gear mechanism to the rotor hub.

6. The drive train as claimed in claim 5, wherein an output of the gear mechanism is electrically insulated from the drive of the generator.

7. The drive train as claimed in claim 5, wherein a gear mechanism casing is insulated from a generator casing.

8. The drive train as claimed in claim 5, wherein the continuous-flow power plant is configured as a wind power plant or a tidal power plant.

9. The drive train as claimed in claim 5, wherein a shaft that connects an output of the gear mechanism and a rotor of the generator is supported via the rotor, with the rotor being bearing-mounted.

10. The drive train as claimed in claim 5, wherein the rotor shaft is mounted via a main bearing in a surrounding support structure to which a gear mechanism casing configured to hold the gear mechanism is connected on both sides via torque brackets.

11. The drive train as claimed in claim 5, wherein the rotor shaft is mounted via two main bearings, lying one behind the other in the axial direction, in a surrounding support structure to which a gear mechanism casing configured to hold the gear mechanism is connected on both sides via torque brackets.

12. The drive train as claimed in claim 5, wherein:

the gear mechanism includes a drive coupled to the rotor shaft, the drive being connected to a planet carrier of a first planetary stage and a ring gear of a second planetary stage, wherein a ring gear of the first planetary stage is fixed and a sun wheel of the first planetary stage is coupled to a first shaft, which as it continues is connected to a planet carrier of a third planetary stage, wherein a planet carrier of the second planetary stage is fixed and a sun wheel of the second planetary stage is connected via a second shaft to a ring gear of the third planetary stage, and wherein a sun wheel of the third planetary stage is connected to an output of the gear mechanism.

13. The drive train as claimed in claim 5, wherein the rotor shaft, in the region of the rotor hub, is mounted on a shaft section via a large bearing.

14. The drive train as claimed in claim 5, wherein the generator is placed in a gear mechanism casing configured to hold the gear mechanism.

15. The drive train as claimed in claim 5, wherein the generator is held in a generator casing that is separate from a gear mechanism casing configured to hold the gear mechanism.

16. The drive train as claimed in claim 15, wherein the generator casing is flanged to the gear mechanism casing.

17. The drive train as claimed in claim 5, wherein the rotor shaft and a drive of the gear mechanism are connected to one another via a clutch.

18. The drive train as claimed in claim 5, wherein a shaft that connects an output of the gear mechanism and the drive of the generator is universal jointed both on the side of the gear mechanism and on the side of the generator.

19. The drive train as claimed in claim 9, wherein the shaft is supported via the rotor, with the rotor being bearing-mounted, on both sides.

* * * * *